UNITED STATES PATENT OFFICE.

ERIK LUDVIG RINMAN, OF DJURSHOLM, SWEDEN.

PROCESS OF DRY DISTILLATION.

1,347,713.

Specification of Letters Patent.

Patented July 27, 1920.

No Drawing.

Application filed November 6, 1918. Serial No. 261,319.

*To all whom it may concern:*

Be it known that I, ERIK LUDVIG RINMAN, a subject of the King of Sweden, residing at Djursholm, in the Kingdom of Sweden, have invented a new and useful Improvement in Processes of Dry Distillation, of which the following is a specification.

The present invention relates to a process of dry distillation with strong bases of mixtures of carbon acids, as well as mixtures thereof with substances containing lignin. The process is particularly applicable to the dry distillation with strong bases of—

1. Waste liquors from the soda cellulose manufacture,
2. Waste liquors obtained by completely dissolving vegetable substances by boiling with caustic soda lye,
3. Waste liquors obtained by boiling waste liquors from the sulfite cellulose manufacture, or portions of such liquors, with hydrate of lime,
4. Waste liquors obtained by treating vegetable substances with caustic soda lye or other alkaline substances, for instance hydrate of lime, for producing fibers capable of being spun, or the like.

The present process is based on the discovery made by the inventor that when the above mentioned substances, also when they are mixed with one another, are dry distilled with strong bases, and if the dry distillation is carried out in the presence of steam, each of said substances will be decomposed at a definite temperature just as if each substance was dry distilled separately. When dry distilling mixtures of the said substances care should thus be taken that every such temperature of decomposition of a substance is maintained during such long time that each distillate may be gathered separately. This is most easily attained by effecting the heating during the dry distillation by means of direct heat transmitted by superheated steam or by superheated steam mixed with gases produced by the distillation. This is preferably carried out by rapidly forcing, for instance by means of a fan, these gases which transmit the heat, into direct contact with the mass to be dry distilled. Furnaces in which the gases produced by the distillation are brought into motion by means of a fan and are heated by means of heat radiators, afterward to be forced into direct contact with the mass to be dry distilled, are thus most suitable for properly carrying out the present process.

The process will be easily understood from the following examples:

Example 1.

The dry distillation of a waste liquor obtained by treating straw with a caustic soda lye at about 100° C. so that about 360 gr. organic substance is extracted from 1 kg. air-dried straw, is suitably carried out in the following manner: The mass to be dry distilled should contain, for 100 parts by weight organic substance, about 50 parts by weight $Na_2O$ and 50 parts by weight CaO. During the dry distillation the temperature is maintained below 200° C. until the greater portion of the water in the mass has distilled off. The temperature is then maintained between 200° C. and 300° C. until ammonia, wax and methyl alcohol have become formed and have distilled off. The temperature is finally maintained between 300° C. and 500° C. when first acetone and afterward acetone and light oils and finally acetone and heavy oils are formed and distil over.

Example 2.

The dry distillation of a waste liquor obtained from the production of soda cellulose from wood may be carried out in the following manner: On 100 parts by weight organic substance the mass should preferably contain about 65 parts by weight $Na_2O$ and 35 parts by weight CaO. During the dry distillation the temperature is maintained within the same ranges as given under Example 1, the same products being formed and obtained with the difference that the quantity of wax is inconsiderable.

Example 3.

The dry distillation of a waste liquor obtained by completely dissolving wood by boiling with caustic soda lye may be carried out in the following manner: On 100 parts by weight organic substance the mass should preferably contain about 60 parts by weight $Na_2O$ and about 30 parts by weight CaO. Temperatures and products are the same as in Example 2.

Example 4.

Dry distillation of waste liquors obtained by retting flax with caustic soda lye: On 100 parts by weight organic substance the mass to be dry distilled should contain about 50 parts by weight $Na_2O$ and about 50 parts by weight CaO. The dry distillation is carried out as stated in Example 1. It is to be observed, however, that the quantity of wax is particularly large. This is also the case with waste liquors from boiling exotic grass, for instance esparto, with caustic soda lye.

*Example 5.*

Dry distillation of waste liquors obtained by boiling a sulfite waste liquor with hydrate of lime: On 100 parts by weight organic substance the mass to be dry distilled should contain about 50 parts by weight $Na_2O$ and about 50 parts by weight CaO. The distillation is carried out in the same manner as in Example 2, and the products obtained are also the same.

The advantages of applying the present process to the dry distillation with strong bases of the abovementioned waste liquors and similar substances, are very great. According to the present process the wood spirit formed at the dry distillation is obtained separated from acetone at the production, which is of the greatest importance in view of the difficulty of separating these substances by rectification. When performing the dry distillation according to the present process a better result is obtained than when dry distilling according to processes heretofore used, not only as regards quality but also as regards quantity. For instance, the quantity of methyl alcohol as well as of acetone formed is increased very considerably for the reason that the substances containing lignin which form methyl alcohol when decomposed, are decomposed before the substances forming acetone are decomposed. On account hereof detrimental by-reactions are avoided, which would occur if the temperature was maintained at such height that all substances became decomposed simultaneously, and through which reactions the yield of acetone and wood spirit would be very considerably reduced.

I claim:

The process of dry distillation of the waste liquors of the cellulose manufacture, as well as other similar waste liquors, which consists in dry distilling said waste liquors with strong bases in the presence of steam at a temperature maintained below 200° C. until the water in the mass has substantially distilled off, afterward maintaining the temperature between 200° C. and 300° C. until methyl alcohol has been formed and substantially distilled off, and finally maintaining the temperature between 300° C. and 500° C. as long as acetone is formed and distils off.

ERIK LUDVIG RINMAN.